United States Patent
Lang et al.

(10) Patent No.: US 9,470,273 B2
(45) Date of Patent: Oct. 18, 2016

(54) AUTOMATICALLY SWITCHING CLUTCH FOR A MOTOR VEHICLE EXTERIOR MIRROR ADJUSTMENT MEANS

(75) Inventors: Werner Lang, Ergersheim (DE); Albrecht Popp, Ergersheim (DE); Elmar Finkenberger, Adelshofen (DE)

(73) Assignee: MEKRA Lang GmbH & Co. KG (DE)

( * ) Notice: Subject to any disclaimer, the term of this patent is extended or adjusted under 35 U.S.C. 154(b) by 152 days.

(21) Appl. No.: 14/112,592

(22) PCT Filed: Oct. 19, 2011

(86) PCT No.: PCT/EP2011/068279
§ 371 (c)(1),
(2), (4) Date: Dec. 31, 2013

(87) PCT Pub. No.: WO2012/146321
PCT Pub. Date: Nov. 1, 2012

(65) Prior Publication Data
US 2014/0131159 A1    May 15, 2014

(30) Foreign Application Priority Data

Apr. 27, 2011 (DE) .................... 20 2011 000 988 U
May 17, 2011 (DE) ........................ 10 2011 050 440

(51) Int. Cl.
*F16D 7/00* (2006.01)
*B60R 1/078* (2006.01)
*F16D 7/10* (2006.01)

(52) U.S. Cl.
CPC ................. *F16D 7/00* (2013.01); *B60R 1/078* (2013.01); *F16D 7/10* (2013.01)

(58) Field of Classification Search
None
See application file for complete search history.

(56) References Cited

U.S. PATENT DOCUMENTS 2,342,540 A * 2/1944 Hale .................. F16D 7/10
                                                192/103 R
2,511,518 A * 6/1950 Stephens ............ F16D 7/10
                                                192/103 FA (Continued)

FOREIGN PATENT DOCUMENTS

CN    1207993    2/1999
CN    2611224    4/2004

(Continued)

OTHER PUBLICATIONS

Chinese Office Action mailed May 6, 2015 in Chinese Application No. 201180070436.2.

(Continued)

*Primary Examiner* — Colby M Hansen
(74) *Attorney, Agent, or Firm* — RatnerPrestia

(57) ABSTRACT

A clutch device transmits rotational energy between a drive input and a drive output, in particular between an electric actuating unit and an actuating element of an adjustable motor vehicle exterior mirror. The clutch device permits a transmission of a load torque $M_R$ from the electric actuating unit to the actuating element in both directions, and in the event of an overload torque greater than a predefined threshold torque $M_K$, automatically permits a relative rotation between the electric actuating unit and the actuating element. Furthermore, the clutch device is designed such that, in the event of a torque direction reversal, no load torque is transmitted over a predetermined free-travel angle ($\phi$).

10 Claims, 8 Drawing Sheets

(56) References Cited

U.S. PATENT DOCUMENTS

| | | | |
|---|---|---|---|
| 4,468,206 | A | 8/1984 | Herchenbach et al. |
| 5,313,336 | A | 5/1994 | Sakao |
| 5,563,741 | A | 10/1996 | Leonberger |
| 6,213,609 | B1 | 4/2001 | Foote |
| 6,325,518 | B1 | 12/2001 | Whitehead et al. |
| 6,361,178 | B1 | 3/2002 | Lang |
| 7,121,673 | B2 | 10/2006 | Sakata |
| 8,628,200 | B2 | 1/2014 | vanStiphout |
| 2002/0021506 | A1 | 2/2002 | Whitehead |
| 2003/0117729 | A1 | 6/2003 | Foote |
| 2003/0202263 | A1 | 10/2003 | Georges |

FOREIGN PATENT DOCUMENTS

| | | | |
|---|---|---|---|
| DE | 3141534 | * | 10/1981 |
| DE | 8906260 | | 11/1990 |
| DE | 39 38 961 | A1 | 5/1991 |
| DE | 60304385 | | 2/2007 |
| DE | 10 2009 003 672 | A1 | 9/2010 |
| EP | 0399401 | | 11/1990 |
| EP | 573130 | | 12/1993 |
| GB | 868642 | | 5/1961 |
| GB | 2 131 503 | A | 6/1984 |
| JP | 58142029 | | 8/1983 |
| JP | 0253652 | | 2/1990 |
| JP | 2149334 | | 12/1990 |
| JP | 0586689 | | 11/1993 |
| JP | 2002541025 | | 12/2002 |
| JP | 2009208629 | | 9/2009 |
| JP | 2009536899 | | 10/2009 |
| RU | 2031266 | | 3/1995 |

OTHER PUBLICATIONS

International Search Report issued in corresponding International Application No. PCT/EP2011/068279, mailed Jan. 31, 2012.
Japanese Office Action issued Sep. 15, 2015 for Japanese Application No. 2014-506778, including English translation.
Russian Decision on Grant mailed Jul. 30, 2015 for Russian Application No. 2013151813/11(080743).
Office Action mailed Sep. 10, 2015 for U.S. Appl. No. 14/112,651.
German Office Action issued in German Application No. 10 2011 002 295.3 mailed Nov. 7, 2011, with partial English translation.
International Search Report issued in International Application No. PCT/EP2011/068280, mailed Jan. 16, 2012.
Japanese Office Action issued in Japanese Application No. 2014-506778 mailed Mar. 10, 2015, with English translation.
Entire patent prosecution history of U.S. Appl. No. 14/112,651, filed Dec. 31, 2013, entitled, "Length-Adjustable Exterior Mirror Arrangement."
Chinese Office Action mailed May 5, 2015 in Chinese Application No. 201180070437.7, with English translation.
Russian Office Action mailed Mar. 23, 2015 in Russian Application No. 2013151813/11(080743), including partial translation.
German Office Action issued in German Application No. 10 2011 050 440.0, mailed Dec. 21, 2011, with partial English translation.
Chinese Second Examination Report, Filing No. 201180070437.7, mailed Nov. 16, 2015.
Japanese Notice of Reason(s) for Refusal for Japanese Application No. 2014-506777, mailed Nov. 10, 2015, with English translation.
Notice of Allowance and Fee(s) Due for U.S. Appl. No. 14/112,651, mailed Jan. 13, 2016.

\* cited by examiner

AUTOMATICALLY SWITCHING CLUTCH FOR A MOTOR VEHICLE EXTERIOR MIRROR ADJUSTMENT MEANS

RELATED APPLICATIONS

This is the U.S. National Phase of International Application No. PCT/EP2011/068279, filed Oct. 19, 2011, which claims the benefit of priority of German Application No. 20 2011 000 988.2, filed Apr. 27, 2011 and the benefit of priority of German Application No. 10 2011 050 440.0, filed May 17, 2011. The contents of all of the foregoing applications are incorporated by reference herein in their entirety and for all purposes.

FIELD

The present invention relates to an automatically switching clutch, in particular for an exterior mirror arrangement for motor vehicles.

BACKGROUND

In some cases it may be necessary not only to adjust the angle or the alignment of a vehicle exterior mirror, but also its distance from the vehicle body. Such a length adjustment may, for example, be necessary in a commercial vehicle with an extra-wide trailer to offer the driver an adequate view to the rear. If no extra-wide trailer is to be pulled, the vehicle exterior mirror which is protruding far outwards can be brought nearer to the body via the length adjustment, which not only has aerodynamic advantages, but also the risk of damaging the exterior mirror when parking or driving through narrow passages decreases.

From the publication DE 39 38 961 A1, a telescoping adjustment for an exterior mirror is known. In this case, the exterior mirror is attached to a continuously adjustable telescopic tube, which in turn is articulated by means of two flat profiles of a holding frame on the vehicle cabin. The length adjustment of the exterior mirror takes place via a positioning motor which drives in a corresponding direction a threaded spindle which is operatively connected to a tube of the telescopic tube assembly.

Since the mirror is constantly exposed to the elements, it may happen that the telescopic tube assembly becomes jammed due to dirt or dust, icing-up, rust, etc., and can no longer be adjusted. When the driver operates the electric motor to move the exterior mirror in this case, the motor due to the adjustment mechanism being blocked, may be damaged.

The same applies if the driver does not stop the electric motor in time before the telescopic tube reaches its respective adjustment end-position.

Furthermore, it has been found that the threaded spindle and the telescopic tube can easily become jammed when, during the extension or retraction of the telescopic tube, the threaded spindle drives the telescopic tube against a stop. When the telescopic tube is subsequently to be moved again in the opposite direction, the drive torque of the electric actuating unit cannot alone release the jammed parts.

Different clutch devices are known from prior art. In the case of the above mentioned exterior mirror adjustment means for a utility vehicle, a simple, economical, low maintenance and robust solution is required. It has been found in practice that none of the known clutches is suitable for this purpose. For reasons of overload protection, non-switchable clutches are excluded. Externally controlled clutches are too costly and also not practical. Against this background, an automatically switching clutch is necessary which overcomes the problems of the prior art.

SUMMARY

An object of the present invention is to provide a clutch device that protects the electric positioning motor against overload and permits a reliable length adjustment of the vehicle outer mirror or the holding member, on which the vehicle outside mirror is mounted, for mounting on the vehicle.

This object is achieved with respect to a clutch device in accordance with embodiments of the invention.

A clutch device according to the invention, which serves the purpose of transmitting a rotational energy between a driving side and a driven side or between an electric actuating unit and an actuating element, permits a transmission of a load torque, necessary for the adjustment of the actuating element, from the electric actuating unit to the actuating element in both rotational directions and automatically permits a relative rotation between the electric actuating unit and the actuating element in the event of an overload torque that is greater than a predetermined threshold torque. Furthermore, the clutch device is designed such that in case of a torque direction reversal it does not transmit over a predetermined free-travel angle the load torque necessary for the adjustment of the actuating element when there is a torque direction reversal.

The clutch device according to the invention may be used with a vehicle exterior mirror or holding member to which the vehicle exterior mirror is mounted, and which is adjustable by a motor and it serves here for the transmission of a rotational energy from an electric actuating unit to an actuating element which is indirectly or directly connected to the exterior mirror. It transmits in this case a load torque, necessary for the adjustment of the holding member, from the electric actuating unit to the actuating element, in both rotational directions, and automatically permits a relative rotation between the electric actuating unit and the actuating element under an overload torque greater than a predetermined threshold torque. In the case of a torque direction reversal, i.e. when changing the direction of travel of the holding member, the clutch device does not transmit over a predetermined clearance or free-travel angle the load torque necessary for the adjustment of the holding member such that, prior to the transmission of the load torque, it automatically permits relative rotation, limited by the free-travel angle, between the electric actuating unit and the actuating element.

The clutch according to the invention is thus configured such that in the event of a torque direction reversal no adjustment torque is transmitted over a predetermined free-travel angle. In this way, on the one hand an overload protection is ensured and on the other hand, in the case of a change in rotational direction, a load-free start-up of the electric actuating unit to a predetermined rated speed is permitted. Both have a positive effect on the operation and the life of the electric actuating unit.

Thus the clutch according to the invention is an automatically switching clutch, in particular a torque-switched clutch. The clutch according to the invention differs from known torque-switched clutches such as slip clutches, locking-member clutches or shear pin clutches in that it can transmit a load torque in both rotational directions, in the event of exceeding the overload torque, permits a relative movement in both directions between a drive input and a drive output, i.e. between the electric actuating unit and the actuating element, can transmit the load torque and re-couple in both directions in the event of a dropping below the overload torque, and in the event of a torque direction reversal, independent from the direction and without previous exceeding of the overload torque, does not transmit a load torque over a predetermined free-travel angle and thus permits a load free or almost load free (idle torque) relative rotation between drive input and output over the free-travel angle.

In particular, the clutch according to the invention may be designed so that it has identical characteristics in both rotational directions, that is, the torques mentioned above as well as the transmittable load torque and the non-transmittable overload torque are equal in both directions.

Because a load-free or nearly load-free relative rotation within the free-travel angle between drive input and output is possible, the positioning motor can be started after a change in direction without load torque, i.e. load-free, and the positioning motor needs to carry only the acceleration torque which is required for the acceleration of all masses to be moved of the length adjustment mechanism. In this way, the positioning motor reaches its rated torque and its rated speed more quickly.

By means of the load-free start-up, a part of the kinetic energy of the accelerated masses is transferred, after passing through free-travel angle and with the coupling of the electric actuating unit and actuating element, in the form of an impact to the actuating element, before the electric actuating unit and the actuating element rotate with each other in the coupled and synchronous state, and the load torque is transferred via the clutch. This effect which is undesired in normal transmission technology and is suppressed mostly by means of spring cushioned and torsionally flexible clutches, is actually intended in the clutch device according to the invention, in order to release a temporary jamming of the holding member and the housing, e.g. because of dirt, icing up, etc.

According to a further or another aspect, the free-travel angle is smaller than 90°. A free-travel angle that is too large would lead to too much play between drive input and output, which would make adjustment, in particular a fine adjustment of the exterior mirror almost impossible. The free-travel angle lies preferably in the region of 15° to 25°. This preferred range of angle permits on the one hand an adequate rotational angle range for the starting up of the electric actuating unit and on the other hand keeps the play between drive input and output within an acceptable range, such that the clutch is relatively quickly coupled in the event of a change in rotational direction and the response behaviour of the clutch in the event of adjustment of the exterior mirror is satisfactory.

In order to hold/fix the holding member or the exterior mirror in a defined position, a clamping device according to a further or another aspect of the invention may be provided, which clamping device prevents a relative movement by the holding member and a guide section or a housing of the exterior mirror bracket. Furthermore the electric actuating unit can adjust the holding member even when the holding member is fixedly clamped to a guide section via the clamping device or is heavily displaceably fixed via a similar device, wherein the load torque necessary for adjusting the holding member and transmittable by the clutch device is greater than the frictional torque exerted by the clamping device and is smaller than the threshold torque of the clutch device.

By means of the clamping of the holding member, the kinematic chain between the electric actuating unit and the holding member is disconnected. The play (free-travel angle) in the clutch therefore does act as a play between the holding member and the housing on which the holding member is guided. This means that the holding member and with it the exterior mirror is fixed to its position when the electrical actuating unit is not operated or during a torque direction reversal of the electric actuating unit.

According to the invention, the clutch device may comprise a clutch bell driven by the electric actuating unit or a clutch ring and a carrier rotationally fixedly connected to the actuating element. Here the carrier may comprise rolling elements or sliding elements distributed evenly over the periphery and radial outwardly spring-loaded and pressed against an inner wall of the clutch bell, and the inner wall of the clutch bell may comprise preferably wave-shaped raised portions or protrusions which are evenly distributed over the periphery, which portions push the rolling elements or sliding elements radial inwardly in the event of an overload torque greater than the predetermined threshold torque.

As already mentioned above, through the load-free starting up, a part of the kinetic energy of the clutch bell and of the inertia torque of the electric actuating unit is imparted in the form of an impact to the rolling elements and thereby also to the carrier, before the form-locking fit connection between the rolling elements and the protrusions, i.e. between the clutch bell and the carrier, engages and the torque to be transmitted is transmitted.

In the case that the normal load torque to free the driving and driven elements which are jammed or wedged with each other is not sufficient, the torque transmitted by the electric actuating unit exceeds the predetermined threshold torque and the clutch latches over until the rolling elements meet the next corresponding protrusion, and so on. In the case of a jamming of the holding member due to dirt contamination, the clutch is therefore latched over. By repeated latching-over, there results repeated torque impulses in short intervals and impulse inputs to the actuating element and to the holding member connected to the actuating element, which leads to gradual loosening of the dirt particles.

The free-travel angle can be defined by the distance between two adjacent raised portions, in particular by the distance of respectively facing flanks of two adjacent raised portions.

Radially running recesses which are outwardly opening and evenly distributed over the periphery can be formed in the carrier, in which recesses compression springs are arranged which press radial outwardly on the rolling or sliding elements. Here the rolling or sliding elements are located for the most part in the recesses and are guided in. In this way the torque can be transmitted from the clutch bell via the rolling elements to the carrier.

The spring constant of the compression springs may be chosen corresponding to the raised portions formed on the inner periphery of the driven clutch bell, and in particular corresponding to the height of the raised portions such that the rolling or sliding elements are pushed sufficiently radial inwardly by the raised portions in order to overcome the same, only if an overload torque which is larger than the predetermined threshold torque is exerted on the clutch device. The height of the raised portions corresponds to the spring travel about which the rolling elements and with them the compression springs are radial inwardly pushed by the raised portions of the clutch bell.

In order to roll the rolling elements or push the sliding elements on the inner periphery of the clutch bell between two raised portions in the circumferential direction, the rolling torque of the rolling elements or the frictional torque of the sliding elements is preferably smaller than the load torque. In this way the relative motion of the two clutch parts are permitted over the free-travel angle.

The number of raised portions may be higher than the number of rolling elements or sliding elements. In this way the latching angle and with it the play between clutch bell and carrier or between electric actuating unit and actuating element may be kept low.

The electric actuating unit may be controllable from inside the cabin, which is more comfortable for the operator. The adjustment of the holding member via the electrical actuating unit may take place in various ways. For example the actuating unit may drive a spindle as an actuating element, which spindle engages with a trapezoidal thread which is formed in the slider which is connected to the holding member. When the holding member is configured as a tube, the spindle can accommodate the inside of the holding member, whereby a particularly compact method of construction may be achieved. Alternatively the holding member may be adjusted easily via cables coupled with the slider or via a toothed rack drive.

According to a further or a different aspect of the invention, the holding member for a vehicle exterior mirror is displaceably accommodated in a housing which is in turn fixed to a holder mounted on a vehicle. In this way the housing comprises a housing portion preferably integrally formed from plastic which guides alone the holding member. In the housing portion, in addition to the displaceably accommodated holding member, a motor driven adjustment mechanism, i.e. the electric actuating unit, the actuating element which is connected to the holding member, and the clutch device according to the invention may be accommodated.

An external periphery section of the electric actuating unit mounted on the vehicle may be configured complementarily to a circumferential inner wall of the first housing portion. Thus the electric actuating unit may close and seal the first housing portion mounted on the vehicle such that the entire adjustment mechanism and the electric actuating unit are sealed in the housing portion. Preferably a transmission cover of the electric actuating unit or of the electric motor can undertake this closing or sealing function. In this way not only a simple construction but also an integration of two functions in one component is ensured.

The housing may furthermore comprise a second housing portion via which the holder mounted on the vehicle may be connected to the first housing portion. Thus the first housing portion may be designed corresponding to its main function, namely the sole accommodating and guiding of the holding member and of the adjustment mechanism, and the fixing to the holder mounted on the vehicle may take place via a second housing portion specially provided for this and preferably also integrally formed from plastic. In this way, for example, it may be achieved that a structurally identical first housing portion may be fixed to different holders mounted on the vehicle, while only one correspondingly differently configured second housing portion is used.

The first or second housing portion, preferably both housing portions, has a fixing portion mounted on the vehicle for the fastening to the holder. This fixing portion mounted on the vehicle may comprise a metal plate which serves as local strengthening for the fastening of the housing portion to the holder, without significantly increasing here the weight of the housing in total. In order to improve the manual operability, the metal plate may be integrated in the form of a metal insert molded into the housing portion in the vehicle-side fixing portion of the housing. The properties of the housing may be changed by the dimensioning of the metal plate or metal insert, and adapted to suit the respective custom requirements. Thus according to the invention, the force from the housing can be introduced by safe means onto the holder mounted on the vehicle.

BRIEF DESCRIPTION OF THE DRAWINGS

The foregoing summary and the description that follows will be better understood in conjunction with reference to the attached drawings. In the figures.

DETAILED DESCRIPTION OF PREFERRED EMBODIMENTS

Figure 1:
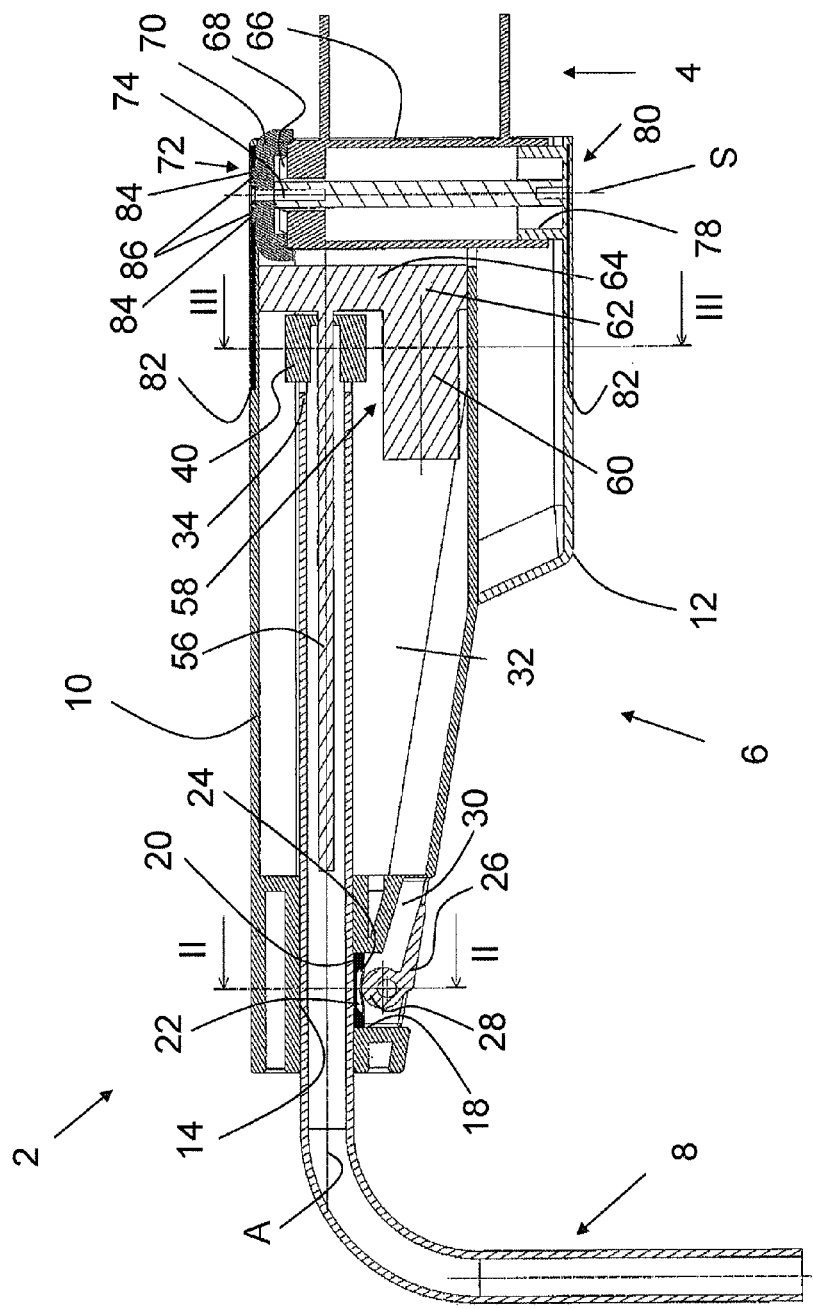
FIG. 1 shows a cross-sectional view of an exterior mirror arrangement in which a clutch device according to an embodiment of the invention is arranged.

FIG. 1 shows a cross-sectional view of an exterior mirror arrangement 2 having a holder 4 mounted on the vehicle, a housing 6 and a holding member 8. The holding member 8 serves the purpose of fastening a vehicle exterior mirror (not shown).

The housing 6 consists of a first housing portion 10 and a second housing portion 12, wherein the first housing portion 10 alone supports and guides the holding member 8 and the second housing portion 12 serves essentially only to attach the housing 6 to the holder 4.

The first housing portion 10 comprises a sliding portion 14 on its side facing away from the holder 4, in which the holding member 8 is displaceably accommodated. The sliding portion 14 is essentially formed by a cylindrical recess in the first housing portion 10, which recess is provided with glide strips (not shown) made of POM.

The sliding portion 14 comprises a radial opening 18, in which a clamping piece 20 is radially displaceably accommodated. The clamping piece 20 is configured complementarily to the holding member 8, i.e. cylindrically concavely configured, and lies planarly at an external wall of the holding member 8 (see FIG. 2). The clamping piece 20 has a recess 22 on its side facing away from the holding member 8, wherein the recess 22 is loaded by a leaf spring 24.

In the sliding portion 14, a manually operable clamping lever 26 is further rotatably arranged, wherein the pivot axis K is a transverse axis which is radially spaced with respect to the centre-axis A of the holding member 8, which transverse axis is located radially externally to the clamping piece 20. The clamping lever 26 comprises a cam 28 which, upon pivoting of the clamping lever 26 about the pivot axis K, pushes on the leaf spring 24 and elastically deforms it in the direction of the holding member 8. The clamping piece 20 is radial inwardly pressed via the spring force of the leaf spring 24 and forms a force-fit or frictional fit connection with a portion of the external wall of the holding member 8 and pushes further the holding member 8 by means of frictional fit at the opposite lying side of the cylindrical recess of the sliding portion 14.

Figure 2:
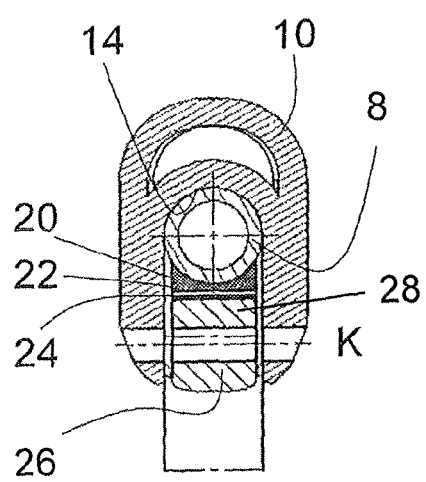
FIG. 2 shows a cross-sectional view along the line II-II in FIG. 1.

FIG. 2 shows a cross-sectional view along the line II-II in FIG. 1, which line runs parallel to the pivot axis K and vertically to the centre-axis A.

The sliding portion 14 further comprises a recess 30 in which the clamping lever 26 in its clamped state (as shown in FIG. 1) is completely accommodated in the sliding portion 14 or the first housing portion 10, and is hidden inside it. The recess 30 is furthermore so sized that one can grip the clamping lever 26 by hand or with a tool in order to operate it.

The first housing portion 10 furthermore comprises a thin-walled hollow body section 32 which borders the sliding portion 14 on the holder side, and surrounds an end section 34 of the holding member 8. As can be seen from FIG. 3 which shows a section view along Line III-III of FIG. 1, the hollow body 32 comprises two inwardly protruding and mutually opposing guide ribs 36 which extend parallel to the centre-axis A and which slidingly engage in corresponding longitudinal grooves 38 of a slider 40 which is fixed at the end section 34 of the holding member 8. So that the slider 40 is rotationally fixed at the holding member 8, the interaction of the guide ribs 36 and grooves 38 ensures that the holding member 8 is displaceable along the centre-axis A but is not rotatable about said centre-axis. Any applications of external force to the vehicle exterior mirror or the holding member 8 is received by the guide ribs 36. The axial extent of the guide ribs 36 corresponds here at least to the maximum displacement of the holding member 8 in the housing 6.

The hollow body section 32 in connection with the guide ribs 36 forms a guide section in the meaning of the invention. Thus the holding member 8 is guided on the one hand at the sliding portion 14 as well as at the guide ribs 36. Furthermore, the sliding portion 14 and the guide ribs 36 take the bending moments. Due to the long lever arm between sliding portion 14 and the position at which the slider 40 is guided into the guide ribs 36, the bending forces may be kept low.

Figure 6:
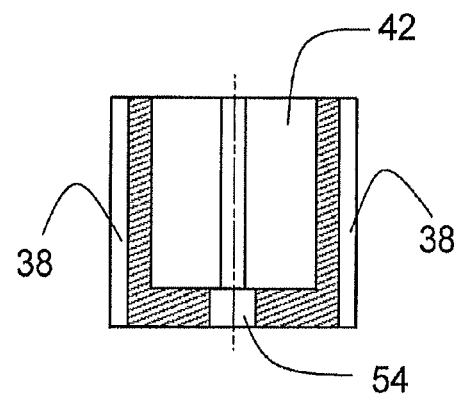
FIG. 6 shows a cross-sectional view of the slider.
Figure 5:
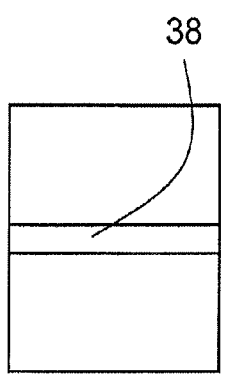
FIG. 5 shows a side view of the slider.
Figure 4:
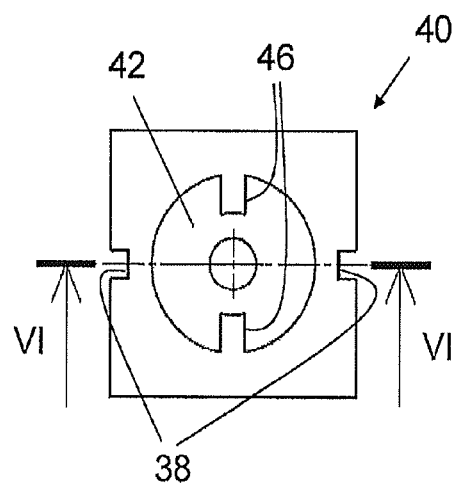
FIG. 4 shows a front view of a slider of the exterior mirror arrangement.
Figure 7:
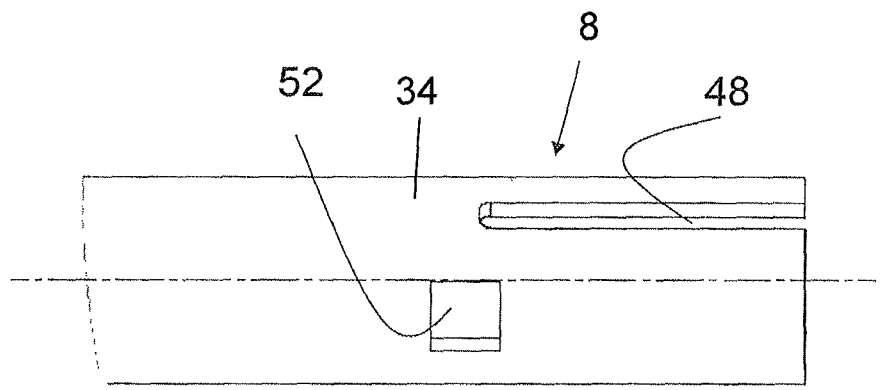
FIG. 7 shows an end section of a holding member of the exterior mirror arrangement.
Figure 8:
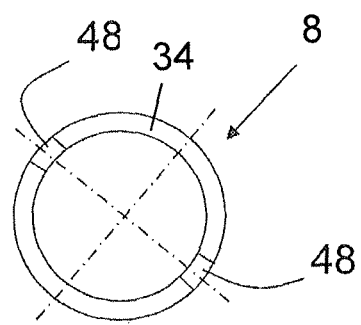
FIG. 8 shows a side view of the end section of the holding member.

FIGS. 4, 5 and 6 show various views of the slider 40. FIG. 4 is a front view, FIG. 5 is a side view and FIG. 6 is a cross-sectional view along line VI-VI in FIG. 4. The slider 40 is essentially a cube-shaped body which comprises the longitudinal grooves 38 on two opposite sides and on a third side comprises a cylindrical recess 42 having two inwardly protruding, mutually opposing and axially extending, protrusions 46. When the slider 40 is introduced to the end section 34 of the holding member 8, the protrusions 46 engage in longitudinal slots 48 which are provided at the end section 34 of the holding member 8 (see FIGS. 7 and 8). The slider 40 configured in this way has a high stiffness and may transmit bending and torsional moments which are introduced via the holding member 8 to the first housing portion 10. Furthermore the slider 40 is an integrated component with customized properties, which in addition is also economically manufacturable.

The outer diameter of the end section 34 and the inner diameter of the recess 42 are toleranced as a press-fit. Furthermore the slider 40 (not shown) comprises snap hooks which engage elastically and with form-locking fit in a corresponding return spring or in a corresponding recess 52 (see FIG. 8). In this way the slider 40 is fixedly rotationally located on the holding member 8 and is axially fixed to it.

A central threaded hole 54 having a trapezoidal thread is configured at the bottom of the recess 42, which hole is in operative connection with a spindle 56 which is driven via an electric actuating unit 58 consisting of an electric motor 60 and a transmission 62. The electric actuating unit 58 as well as the spindle are only schematically shown in FIG. 1. It is noted, however, that a section of the electric actuating unit 58, which is on the side of the holder, e.g. a transmission cover 64, is complementarily configured to the inner periphery of the first housing portion 10 and therefore the adjustment mechanism which is located completely in the first housing portion 10 may be closed off, preferably sealed, from the outside.

When the spindle 56 is driven in the one or the other direction, the slider 40 located in engagement with the spindle 56 is moved along the axis of the spindle 56, which axis coincides with the centre-axis A of the end section 34 of the holding member 8 and represents at the same time the displacement axis of the holding member 8, and the holding member 8 which is fixedly connected to the slider 40 is axially displaced. Here the guide ribs 36 of the first housing portion 10 slide in the longitudinal grooves 38 of the slider 40 and the outer wall of the holding member 8 slides on the glide strips in the sliding portion 14. In order to minimise vibrations between holding member 8 and housing 6, the clamping lever 26 remains closed here. The clamping piece 20 therefore permanently presses on the holding member and maintains the spring-load. The electric motor 60 must therefore overcome basically the frictional force between the plain bearing portion 14 and holding member 8 when operating the holding member 8. The frictional force to be overcome is however reduced by means of the glide strips. When the vehicle exterior mirror and/or the holding member 8 is located in the desired position, the electric actuating unit 58 can be stopped and the position is mechanically fixed via the clamping lever 26 and the clamping piece 20. In this way the electric actuating unit 58 can be released and turned off.

When no glide strips are provided, alternatively the clamping lever 26 can be released before the operation of the holding member 8 and can be clamped after the operation.

As can further be seen in FIG. 1, the first housing portion 10 serves for the partial accommodation of the holder 4 mounted on the vehicle. In this way the holder 4 comprises a hollow cylindrical portion 66 running vertically to the centre-axis A, to which the housing 6 is pivotably fixed about a pivot axis S. The cylindrical portion 66 of the holder 4 comprises at one end an integrally formed latching tooth geometry 68 and can be fixed under interconnection of a latching element 70 to a fixing portion 72 of the first housing portion 10 via a screw connection 74.

On the opposite side, the holder 4 is connected to the housing 6 via the second housing portion 12. In addition the cylindrical portion 66 of the holder 4 accommodates a cylindrical plain bearing bush 78 which is configured inside a fixing portion 80, when the second housing portion 12 is connected to the first housing portion 10.

Figure 3:
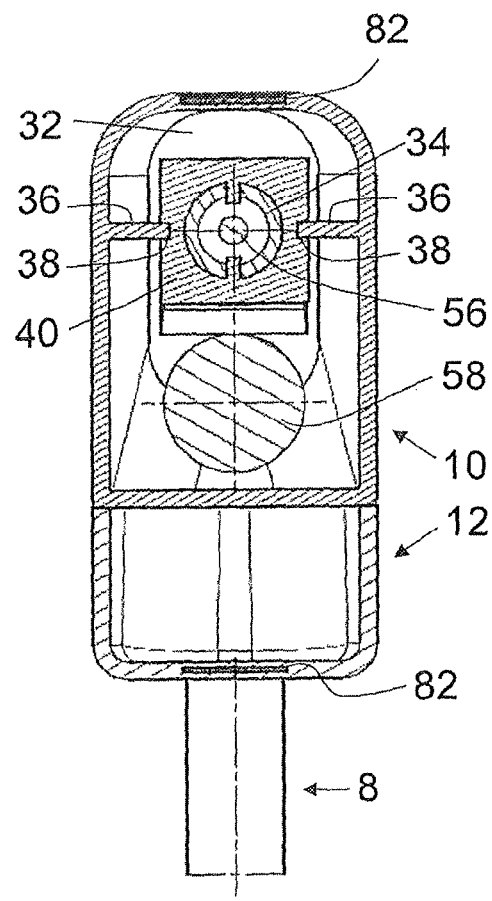
FIG. 3 shows a cross-sectional view along the line III-III in FIG. 1.

As can be understood further from FIGS. 1 and 3, metal inserts 82 in the plastic housing are molded into the thin-walled fixing portions 72, 80 of the first and/or second housing portion 10, 12, which metal inserts serve to strengthen the fixing portions 72, 80 and to apply force from the housing 6 to the holder 4.

As can be understood further from FIG. 1, the fixing portion 72 of the first housing portion 10 comprises grooves 84 in which externally integrally formed protrusions 86 at the latching element 70 engage with a form-locking fit. The holder 4 is screwed via the latching element 70 into the metal inserts 82 molded into the first housing portion 10. In this way the latching element 70 is rotationally fixed to the first housing portion 10. This form-locking fit may also be alternatively achieved through a groove-spring connection.

The cylindrical joint portion 66 of the holder 4 is biased by means of a spring (not shown) against the latching element 70, and the cylindrical joint portion 66 is bordered between the first and the second housing portion 10, 12 such that the latching element 70, under a correspondingly applied pivot torque of predetermined size, twists against the spring pre-load with respect to the latching tooth geometry 68 of the holder 4 and in this way permits a pivoting motion between the housing 6 and the holder 4.

Figure 9:
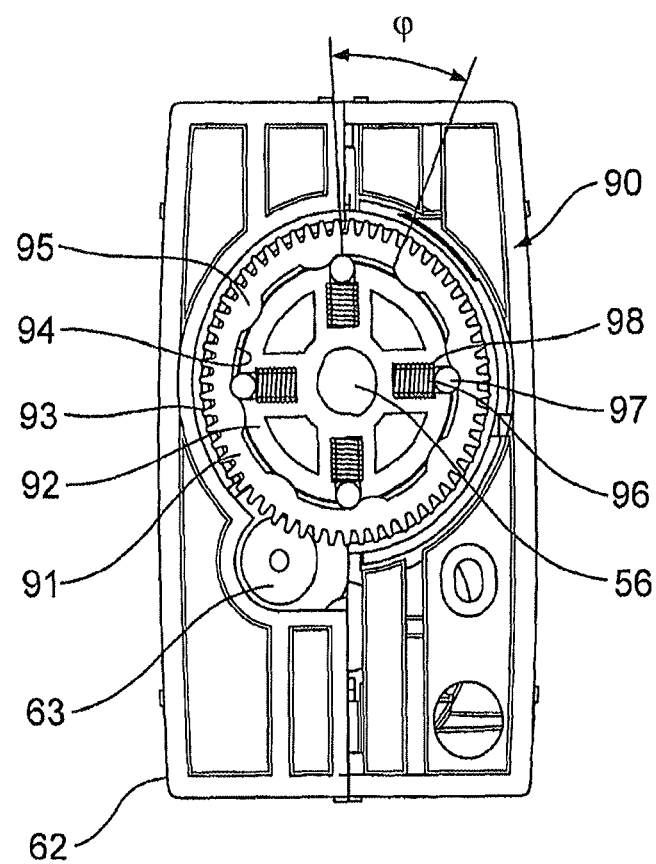
FIG. 9 shows a cross-sectional view of a clutch device according to the embodiment, connected between an electric actuating unit and a spindle.

FIG. 9 shows a cross-sectional view of a clutch 90 connected between the transmission 62 and the spindle 56. The clutch 90 transmits a torque from a transmission stage 63 of the transmission 62 via a clutch bell 91 to a carrier 92 and finally to the spindle 56 which is rotationally fixed to the carrier 92. The transmission stage 63 meshes with outer teeth 93 of the clutch bell 91. At the inner periphery 94 of the cylindrical or ring-like clutch bell 91 are protrusions or cams 95 evenly distributed over the periphery, which protrusions or cams 95 interact via compression springs 96 with radial outwardly biased rollers 97 of the carrier 92. This interaction and the function of the clutch 90 are described in detail below.

The carrier 92 comprises radially running, outwardly opening recesses 98 (in FIG. 9: four recesses) which are evenly distributed over the periphery, in which recesses the compression springs 96 are accommodated. These compression springs 96 load the rollers 97 which are arranged at their ends, radial outwardly against the inner periphery 94 of the clutch bell 91. Here the rollers 97 are located, for the most part, in the recesses 98. When the clutch bell 91 is driven via the transmission stage 63, the rollers 97 roll in the circumferential direction at the inner periphery 94 between the protrusions 95 of the clutch bell 91 until they run against one of the protrusions 95. The protrusions 95 attempt to inwardly push the rollers 97 against the spring force of the compression springs. The spring forces are chosen so that they do not inwardly deflect under a normal driving of the spindle 56 and by operation of the holding member such that the rollers of the carrier 92 and the protrusions 95 of the clutch bell 91 form a type of form-locking fit and therefore transmit torques from the clutch bell 91 to the carrier 92 and thus to the spindle 56.

In the case of a change in direction of the clutch bell 91, the carrier 92 stops until the rollers 97 run against the next protrusion 95 in the rotational direction and enter into the above mentioned form-locking fit with these.

In order to ensure an overload protection, the rollers 97 may be pushed so far radial inwardly under a predetermined threshold torque $M_K$ by the protrusions 95 against the compression springs 96 that they overcome the protrusions 95 according to the principle of a ratchetting clutch and permit a larger relative rotation between clutch bell 91 and carrier 92. Thus damage to the electric actuating unit 58 is prevented.

Figure 10:
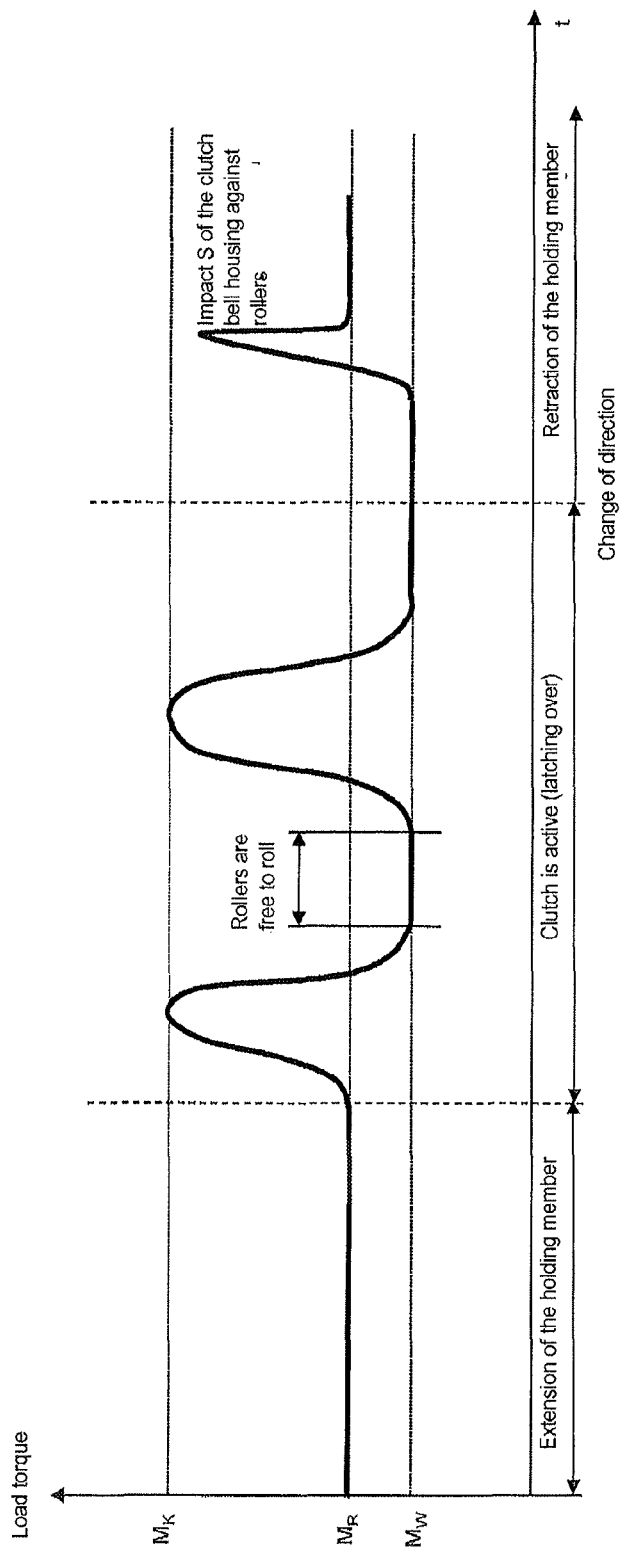
FIG. 10 shows a torque-time diagram which shows the torque exerted on the clutch device during adjustment of the holding member.

FIG. 10 shows a time-torque diagram. By excursion of the holding member 8, the rollers 97 lie at the protrusions 95 of the clutch bell 91 and thus transmit a determined torque which should reach at least the frictional torque $M_R$ between the holding member 8 and the clamping piece 20 in the sliding portion 14.

When the holding member 8 has reached its maximum extended position, for example because of a stop, the holding member 8, and with it the spindle 56 and/or the carrier 92 does not permit itself to rotate further. When the clutch bell 91 is further driven, the clutch bell 91 reaches relatively quickly the clutch torque $M_K$, i.e. the maximum torque $M_K$ transmittable via the clutch 90, which torque is determined by the interaction of the protrusions 95 and the compression springs 96. If the clutch torque $M_K$ is reached, the rollers 97 deflect radial inwardly such that the protrusions 95 can pass. As a result, the rollers 97 roll on the inner peripheral portion 94 between the protrusions 95, i.e. the rollers 97 roll freely. The rolling frictional torque $M_W$ between rollers 97 and clutch bell 91 lies below the frictional torque $M_R$, i.e. below the torque to be transmitted normally. After a predetermined rotational angle φ, the rollers 97 again run against the corresponding protrusions 95 and pass these when the clutch torque $M_K$ is exceeded.

When the rotational direction of the clutch bell 91 changes, the rollers 97 roll in the opposite direction until the next protrusion. That means it is therefore possible, with a change in direction, to run though the free-travel arc length φ without load until the opposite flanks of the protrusions 95 make contact with the rollers 97. Here a part of the kinetic energy of the clutch bell 91 and of the inertial mass of the motor is imparted in the form of an impact S to the rollers 97 and with it to the carrier 92, before the form-locking fit between the rollers 97 and the protrusions 95, i.e. between the clutch bell 91 and the carrier 92 is set up, and the torque $M_R$ to be transmitted has been transmitted.

Figure 12:
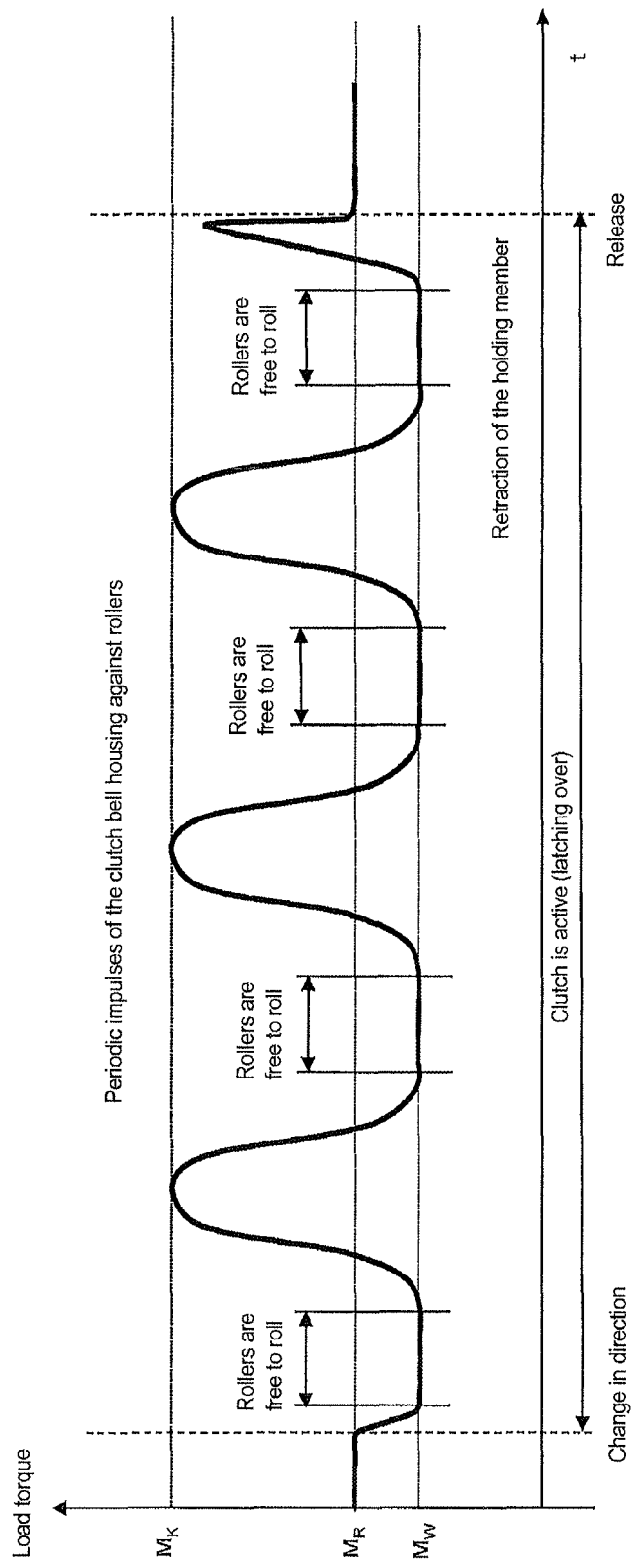
FIG. 12 shows a further torque-time diagram which shows the torque exerted on the clutch device during release of a jammed holding member.

This effect which is undesired in normal transmission technology is intentional in the exterior mirror arrangement according to the invention. Namely, if the extension movement of the holding member (Phase I in FIG. 10) is continued until the clutch operation initiates (Phase II in FIG. 10), a light straining of the slider 40 with the spindle 56 may occur. In addition, the holding member 8 can also jam due to dirt contamination inside the housing 6. This loading or jamming may be released by the impact or impulse input, upon the change in direction. When this jamming is not released with the first impact and the clutch torque MK is exceeded, the clutch 90 latches over. The periodical impulse input, created in this way, on the carrier 92 and thereby on the spindle 56 leads to gradual loosening of the dirt particles. Thus dirt particles, which give rise to a jamming between holding member 8 and housing 6, can be loosened effectively (see FIG. 12).

The free travel also has the further advantage that the electric motor 60 can start up almost load-free up to a speed less than the rated speed. With a switching off of the feed motion, the rest position of the spindle 56 and with it that of the carrier 92 is set, such that the rollers 97 come to rest, relative to the rotational direction present in feeding, directly before the flanks of the wave-like raised portions 95 in the clutch bell 91. It is therefore possible, with a change in direction, to run though the free-travel arc length φ without load until the flanks lying opposite the flanks make contact with the rollers 97.

Thus the clutch 90 comprises a large play φ between carrier 92 and clutch bell 91. However, this is unproblematic within the context of the exterior mirror arrangement 2 according to the invention, because the kinematic process-chain between motor 60 and holding member 8 is disconnected by the clamping of the clamping piece 20. Therefore the play in the clutch 90 does not act as play between holding member 8 and housing 6.

Figure 11:
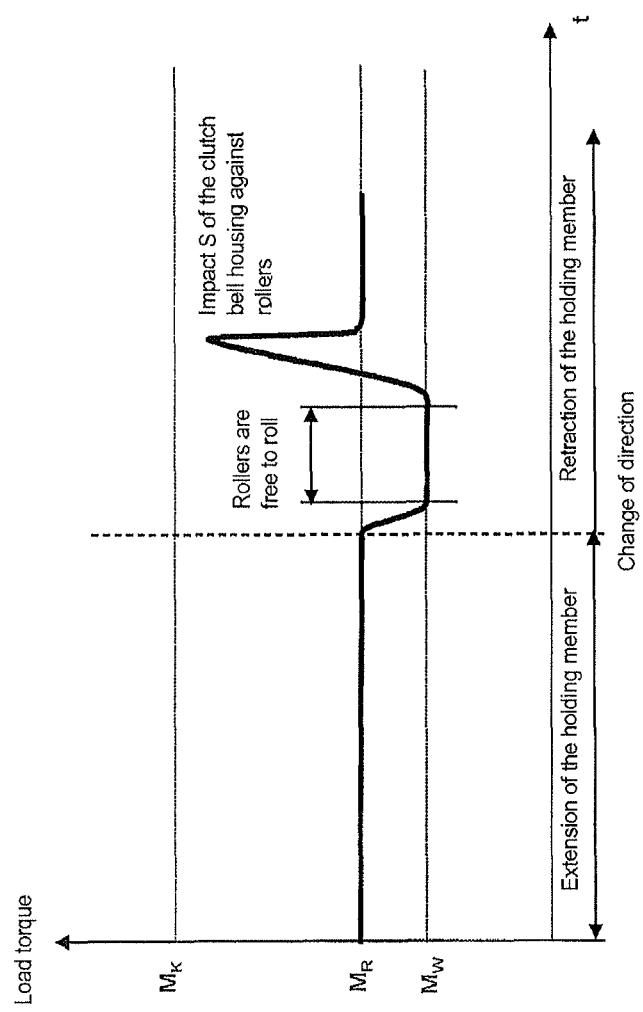
FIG. 11 shows a further torque-time diagram which shows the torque exerted on the clutch device during adjustment of the holding member.

FIG. 11 shows a further torque-time diagram in the case of the adjustment of the holding member 8. It shows the load torque in the case of an ordinary change in rotational direction without showing the load torque in the case of overload. Because the protrusions 95 at the inner periphery 94 of the clutch bell 91 are spaced apart from each other, a known time elapses until the rollers 97 meet the protrusions 95 in the opposite direction at the inner periphery 94 of the clutch bell 91. The transmittable torque reduces to the frictional torque $M_W$ that exists when the rollers 97 roll on the inner peripheral surface 94 of the clutch bell 91. When the rollers 97—until then load-free—meet the flanks of the next protrusions 95, an impact torque conditional on inertia acts on the rollers 95 that however decays rapidly to the normal operating torque.

It has been described in the above an exterior mirror adjustment means for motor vehicles and an automatically switching clutch arranged within it, said automatically switching clutch being for a motor vehicle exterior mirror arrangement.

Of course the exterior mirror arrangement described above can be modified within the scope of the claims.

For example, the adjustment of the holding member can take place via cables or a rack drive.

Furthermore the elements which are complementary to each other, for example the connection between the slider and the end section of the holding member or the guide ribs, can be inversely designed. For example the slider can comprise longitudinally running protrusions which slide in corresponding grooves in the first housing portion.

The axial lengths of the housing can be shortened or lengthened according to the necessary displacement of the holding member.

Furthermore the guide ribs can also be strengthened with metal inserts. Alternatively the slider can be guided from all sides, i.e. by four guide ribs.

Stops can be provided at the guide ribs and/or the first housing portion for limiting the maximum displacement.

In addition the metal inserts at the fixing portion of each housing portion may be designed longer or thicker according to expected torsion and bending moments.

Furthermore, in some circumstances, the glide strips in the sliding portion may be omitted or other materials may be used for the glide strips.

In the case of the described clutch device, the raised portions 95 are located at the inner periphery 94 of the clutch bell 91 and act together with radial outwardly spring-loaded rolling elements 97. Depending on the application and the available installation space, the raised portions 95 may be provided at the inner clutch part (carrier 92) and act together with radial inwardly preloaded rolling elements 97 of the outer clutch part (clutch bell 91).

The clutch device according to the invention is not necessarily to be used together with the described exterior mirror arrangement, rather it is to be considered as an independent machine element which is transferable to exterior mirror arrangements and systems outside this technical area. However the advantageous effects of the clutch device according to the invention come to bear particularly in the case of motor vehicle exterior mirrors that are adjustable by motor, because it permits a load-free start-up of the motor due to the free travel path, the impact-like impulse input can release any tension between the slider and the spindle or loosen dirt contamination, and the clutch device constitutes a simple and robust solution.

The invention claimed is:

1. A clutch device for transmission of a rotational energy between an electric actuating unit and an actuating element, wherein the clutch device comprises a first clutch part driven by the electric actuating unit, and a second clutch part rotationally fixedly connected to the actuating element, wherein the first or second clutch part comprises a number of rolling elements or a number of sliding elements distributed evenly over its periphery and spring-loaded and pressed against the other one of the first or second clutch parts, wherein said other one of the first and second clutch parts comprises a number of evenly distributed raised portions over its periphery, wherein the clutch device permits a transmission of a load torque ($M_R$) from the electric actuating unit to the actuating element in both directions, and in an event of an overload torque greater than a predetermined threshold torque ($M_K$), in which the raised portions push the rolling elements or sliding elements, automatically permits a relative rotation between the electric actuating unit and the actuating element, wherein the clutch device, in an event of a torque direction reversal without previous exceeding of the threshold torque ($M_K$), does not transmit the load torque ($M_R$) over a predetermined free-travel angle (φ), wherein the free-travel angle (φ) is defined by a distance between two adjacent raised portions.

2. The clutch device according to claim 1, wherein the free-travel angle (φ) is less than 90°.

3. The clutch device according to claim 1, wherein the clutch device comprises a clutch bell or clutch ring, driven by the electric actuating unit as the first clutch part, and a carrier rotationally fixedly connected to the actuating element as the second clutch part, wherein the carrier comprises the rolling elements or the sliding elements distributed evenly over a periphery of the carrier, the rolling elements or sliding elements radially outwardly spring-loaded and pressed against an inner wall of the clutch bell or the clutch ring; and the inner wall of the clutch bell or the clutch ring comprises the evenly distributed raised portions over its periphery, wherein the raised portions push the rolling elements or the sliding elements in the event of an overload torque greater than the predetermined threshold torque ($M_K$).

4. The clutch device according to claim 3, wherein the free-travel angle (φ) is defined by a distance between respectively facing flanks of two adjacent raised portions.

5. The clutch device according to claim 3, wherein the carrier comprises radially running recesses, the radially running recesses being outwardly opening and evenly distributed over a periphery of the carrier and wherein compression springs that press radial outwardly on the rolling elements or sliding elements are arranged in the recesses, and wherein the rolling elements or sliding elements are guided into the recesses.

6. The clutch device according to claim 5, wherein a spring constant of the compression springs is chosen such that the rolling elements or sliding elements are pushed sufficiently radially inwardly by the raised portions in order to overcome the raised portions only if the overload torque which is larger than the predetermined threshold torque ($M_K$) is exerted on the clutch device.

7. The clutch device according to claim 3, wherein, in order to roll the rolling elements or push the sliding elements on the inner wall of the clutch bell between two raised portions in a circumferential direction, a rolling torque ($M_W$) of the rolling elements or a frictional torque ($M_W$) of the sliding elements is smaller than the load torque ($M_R$).

8. The clutch device according to claim 1, wherein the number of raised portions is higher than the number of rolling elements or sliding elements.

9. An exterior mirror arrangement for motor vehicles comprising:
- a holder mounted on a vehicle;
- a housing fixed to the holder;
- a holding member for a vehicle exterior mirror displaceably accommodated in the housing; and
- a clutch device for a transmission of a rotational energy between an electric actuating unit and an actuating element, wherein the clutch device comprises a first clutch part driven by the electric actuating unit and a second clutch part rotationally fixedly connected to the actuating element, wherein the first or second clutch part comprises rolling elements or sliding elements distributed evenly over its periphery and spring-loaded and pressed against the other one of the first or second clutch parts, wherein said other one of the first or second clutch parts comprises evenly distributed raised portions over its periphery, wherein the clutch device permits a transmission of a load torque ($M_R$) from the electric actuating unit to the actuating element in both directions, and in an event of an overload torque greater than a predetermined threshold torque ($M_K$), in which the raised portions push the rolling elements or sliding elements, automatically permits a relative rotation between the electric actuating unit and the actuating element, wherein the clutch device, in an event of a torque direction reversal without previous exceeding of the threshold torque ($M_K$), does not transmit the load torque ($M_R$) over a predetermined free-travel angle ($\phi$), wherein the free-travel angle ($\phi$) is defined by a distance between two adjacent raised portions,
- wherein the holding member is adjustable via the electric actuating unit and a drive spindle directly or indirectly connected to the holding member, and the clutch device is connected between the electric actuating unit and the drive spindle.

10. The exterior mirror arrangement for motor vehicles according to claim 9, wherein:
- the exterior mirror arrangement further comprises a clamping device comprising a clamping piece loadable against an external wall of the holding member via a cam of a clamping lever pivotably arranged at the housing and which prevents, via a force-fit or frictional fit, a relative movement between the holding member and the housing of the exterior mirror arrangement; and
- the electric actuating unit can adjust the holding member even when the holding member is fixedly clamped via the clamping device, wherein the load torque ($M_R$) necessary for adjusting the holding member and transmittable by the clutch device is greater than a frictional torque ($M_W$) exerted by the clamping device and is smaller than the predetermined threshold torque ($M_K$) of the clutch device.

* * * * *